United States Patent [19]

Hulten

[11] 4,247,585
[45] Jan. 27, 1981

[54] AUTOMOTIVE BODY ASSEMBLY (FASCIA SUPPORT WIRE)

[75] Inventor: Richard E. Hulten, Lake Orion, Mich.

[73] Assignee: McCord Corporation, Detroit, Mich.

[21] Appl. No.: 44,919

[22] Filed: Jun. 4, 1979

Related U.S. Application Data

[63] Continuation of Ser. No. 960,878, Nov. 15, 1978, abandoned.

[51] Int. Cl.³ .............................................. B60R 13/04
[52] U.S. Cl. .................................... 428/31; 293/120; 293/121; 296/188; 296/189
[58] Field of Search .................. 428/31; 293/120–122; 296/189, 188

[56] References Cited

U.S. PATENT DOCUMENTS

| 1,649,166 | 11/1927 | Kahil | 293/121 |
| 3,875,661 | 4/1975 | Lidstrom et al. | 296/28 |
| 4,066,285 | 1/1978 | Hall et al. | 428/31 X |
| 4,083,592 | 4/1978 | Rubin et al. | 428/31 X |
| 4,171,143 | 10/1979 | Huber et al. | 293/120 X |

*Primary Examiner*—George F. Lesmes
*Assistant Examiner*—Alexander S. Thomas
*Attorney, Agent, or Firm*—McGlynn and Milton

[57] ABSTRACT

An automotive body assembly including a flexible plastic component defining the front fascia portion of the body of an automotive vehicle. The front fascia has an exterior finished surface and interior hidden surface with retaining tabs integral with the fascia and extending from the fascia on the interior surface thereof for allowing a stiffening means defined by a wire-like rod to be snapped into position across the interior surface of the fascia for stiffening the fascia. The rod is flexible transversely to its longitudinal axis but is less flexible than the fascia.

7 Claims, 7 Drawing Figures

AUTOMOTIVE BODY ASSEMBLY (FASCIA SUPPORT WIRE)

This is a continuation of application Ser. No. 960,878 filed Nov. 15, 1978, now abandoned.

BACKGROUND OF THE INVENTION

1. Field of the Invention

In many automotive vehicles the front end rear end extremities of the body are defined by molded plastic components which are painted the same color as the remainder of the body made of stamped metal parts. Such components are referred to as fascias and the subject invention relates to such fascias.

2. Description of the Prior Art

The plastic fascias are attached to the structure of the vehicle from which some support is attained. However, additional support is frequently required to prevent sagging of the fascia. Metal plate-like members have been attached to fascias to provide support and have been attached to the fascia at spaced points by staples, rivets, or the like. One of the problems associated with this sort of assembly is that there is no accommodation for the differences in thermal expansion between the plastic and the metal and therefore fascia distortion can occur because of differential thermal expansion between the fascia and the support member having fixed attaching points. Support members have also been molded within the fascias, however, such assemblies also experience the problem associated with the difference in thermal expansion and permanent deformation in response to small displacements. Also, such assemblies are relatively expensive compared to the assembly of the subject invention.

SUMMARY OF THE INVENTION

An automotive body assembly including a flexible plastic component for defining a portion of the body of an automotive vehicle with the component having an exterior finished surface and an interior hidden surface. A stiffening means is disposed in a stiffening position along the interior surface of the component for stiffening the component and the component include retaining means for allowing the stiffening means to be snapped into and retained in the stiffening position.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
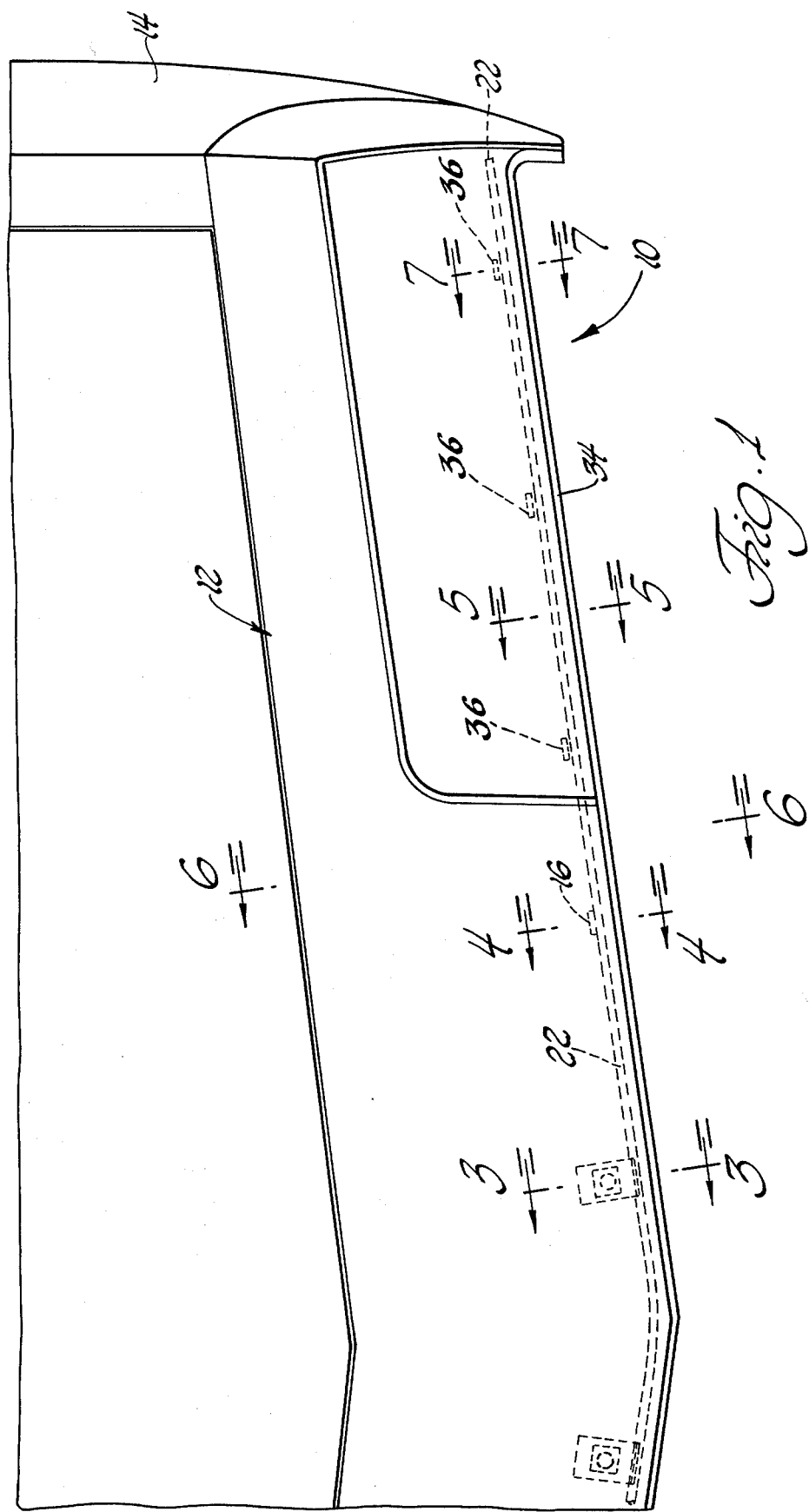
FIG. 1 is a plan view of an automotive body assembly constructed in accordance with the subject invention.
Figure 2:
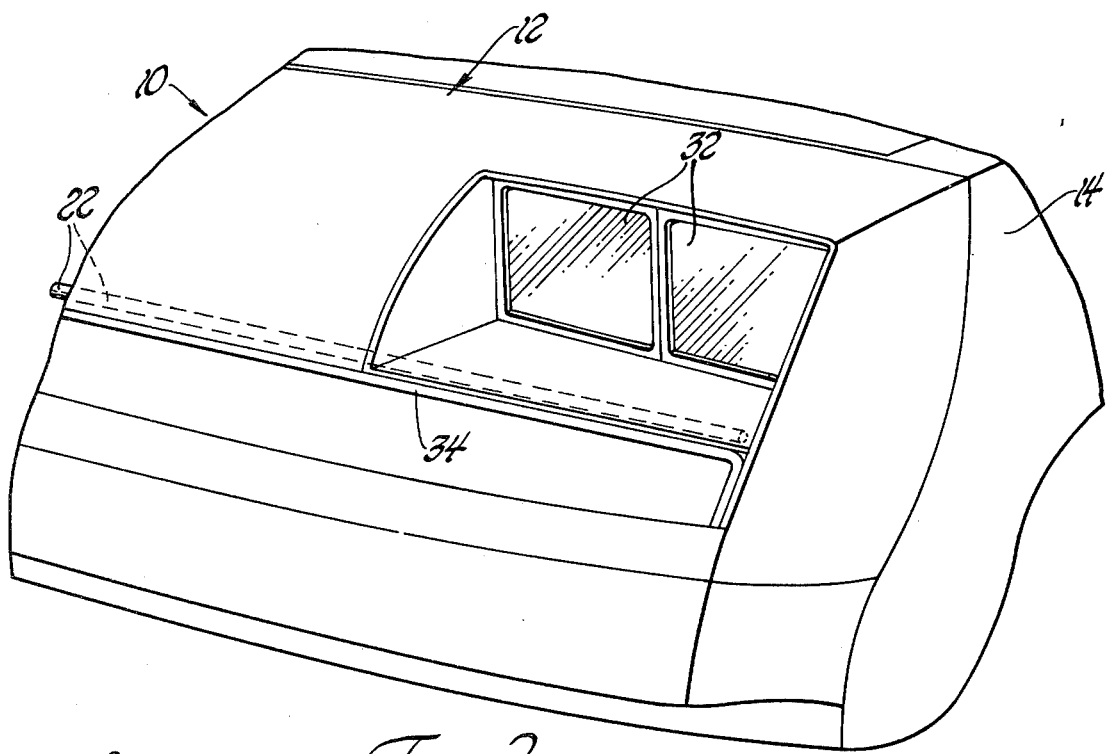
FIG. 2 is a fragmentary perspective view showing the assembly of the subject invention.

An automotive body assembly constructed in accordance with the subject invention is generally shown at 10 in FIGS. 1 and 2. The automotive body assembly includes a flexible plastic component for defining a front end portion of the body of an automotive vehicle. The remaining portion of the body of the automotive vehicle is defined by the rigid or metal components 14. The front end component 12 is a fascia having an exterior finished surface and an interior hidden surface. The exterior finished surface is normally painted a color matching the color of the painted rigid body components 14.

The fascia 12 includes retaining means defined by the various tabs 16, 18 and 20 respectively. A stiffening means comprising a metal wire-like rod 22 is disposed in a stiffening position along the interior surface of the fascia 12 for stiffening the fascia. The rod 22 is an elongated piece of metal stock preferably a circular wire-like rod. More specifically, the tabs 16, 18 and 20 defining the retaining means allows the rod 22 to be snapped into position and retained in that stiffening position.

Figure 3:
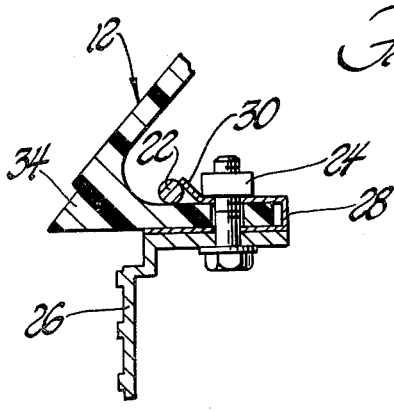
FIG. 3 is a fragmentary cross-sectional view taken substantially along line 3—3 of FIG. 1.
Figure 4:
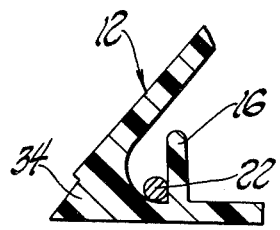
FIG. 4 is a fragmentary cross-sectional view taken substantially along line 4—4 of FIG. 1.
Figure 5:
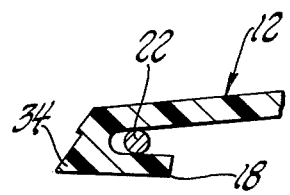
FIG. 5 is a fragmentary cross-sectional view taken substantially along line 5—5 of FIG. 1.

As illustrated in FIGS. 1 and 3, a bolt 24 interconnects the fascia 12 and a trim component 26. Bolt 24 also retains a clip 28 in position. The clip 28 has a flair or tabs 30 which engages the rod 22 for positioning the rod. The rod is elongated and the tabs 16, 18, 20 and 30 allow relative movement between the rod 22 and the fascia 12 in a direction longitudinally of the rod 22 whereby there is no distortion in the fascia upon differences in thermal expansion between the fascia 12 and the rod 22. Further, the rod 22 is flexible in a direction transverse to its longitudinal length but it is less flexible than the fascia 12. Thus, the rod 22 provides a support for the fascia 12 yet is flexible in the event the fascia is impacted but will spring back or return the fascia to its original position. In the event there is an impact against the fascia which is severe enough, the rod 22 will snap out of its position before being permanently bent. The tabs 16, 18 and 20 are integral with and extend from the interior surface of the fascia 12 for receiving and retaining the rod 22. The fascia 12 includes headlight openings 32 which are disposed rearwardly of an apex 34. The apex 34 extends completely across the fascia 12 and the tabs 16, 18 and 20 are disposed within the apex 34. The tab 16 extends vertically, upwardly from the horizontally extending portion of the apex 34. The tabs 18 and 20 extend horizontally rearwardly from the apex 34. The tab 20 includes a shoulder 36 over which the rod 22 must be snapped. All of the tabs define pockets into which the rod 22 is snapped and retained by the respective tabs.

Figure 6:
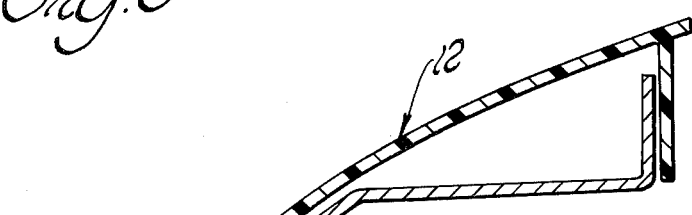
FIG. 6 is a fragmentary cross-sectional view taken substantially along line 6—6 of FIG. 1.
Figure 7:
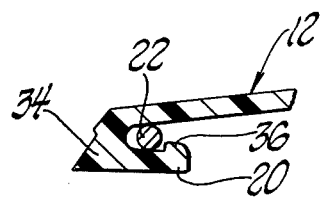
FIG. 7 is a fragmentary cross-sectional view taken substantially along line 7—7 of FIG. 1.

As illustrated in FIG. 6, a support portion 38 is attached to the fascia 12 by a fastener assembly 40 and is a part of the means for attaching the fascia 12 to the automotive body structure.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property of privilege is claimed are defined as follows:

1. A flexible panel subassembly for installation on an automotive vehicle body comprising; a flexible plastic component defining a fascia portion of the exterior of an automotive vehicle, said component having an exterior surface and an interior hidden surface, an elongated rod-like stiffening means disposed in a stiffening position along said interior surface for stiffening said component, said component including retaining means for allowing said stiffening means to be snapped into and retained in said stiffening position, said stiffening means being flexible in a direction transverse to its length but less flexible than said component and wherein said retaining means allows relative movement between said stiffening means and said component in a direction longitudinally of said stiffening means.

2. A subassembly as set forth in claim 1 wherein said retaining means comprises a plurality of tabs integral with and extending from said interior surface of said component for receiving and retaining said stiffening means.

3. A subassembly as set forth in claim 2 wherein said stiffening means comprises an elongated piece of metal stock.

4. A subassembly as set forth in claim 2 wherein said component comprises a fascia defining the front end extremity of an automotive vehicle.

5. A subassembly as set forth in claim 4 wherein said fascia includes headlight openings.

6. A subassembly as set forth in claim 5 wherein said headlight openings are disposed rearwardly of an apex in said component and said tabs are disposed within said apex.

7. A subassembly as set forth in claim 8 wherein said stiffening means comprises a circular, wire-like rod.

* * * * *